United States Patent [19]

Moretti

[11] Patent Number: 4,781,094
[45] Date of Patent: Nov. 1, 1988

[54] DEVICE FOR TRANSVERSELY CUTTING STRIPS OF DEFORMABLE MATERIAL

[75] Inventor: Massimo Moretti, Rome, Italy

[73] Assignee: The Firestone Tire & Rubber Company, Akron, Ohio

[21] Appl. No.: 35,423

[22] Filed: Apr. 7, 1987

[30] Foreign Application Priority Data

Apr. 8, 1986 [IT] Italy .................. 67281 A/86

[51] Int. Cl.⁴ .............. B26D 3/02; B29H 17/30; B65H 35/04
[52] U.S. Cl. .................. 83/488; 83/614; 83/581; 83/486.1
[58] Field of Search ............ 83/488, 486.1, 614, 83/315, 374, 461, 581

[56] References Cited

U.S. PATENT DOCUMENTS 3,072,004  1/1963  Jenkins ................. 83/488 X
4,054,072  10/1977  Jagers .................. 83/488

Primary Examiner—Donald R. Schran
Attorney, Agent, or Firm—Ernst H. Ruf

[57] ABSTRACT

A device for transversely cutting strips of deformable material, whereby a powered, rotary cutting blade is arranged with its outer edge substantially tangent with a surface supporting a strip of uncut material, and is designed to move, on a support, in a cutting direction transverse in relation to the strip itself; the aforementioned device embodying a pressure member designed to move with the blade in the cutting direction, and to press down, onto the supporting surface and during the cutting operation, the uncut portion of the strip located immediately ahead of the blade in the cutting direction.

6 Claims, 4 Drawing Sheets

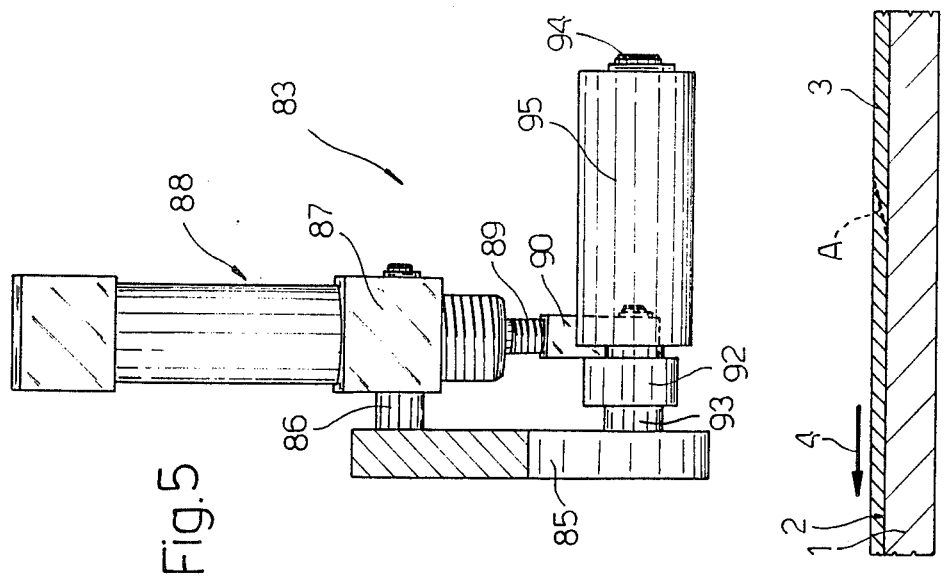
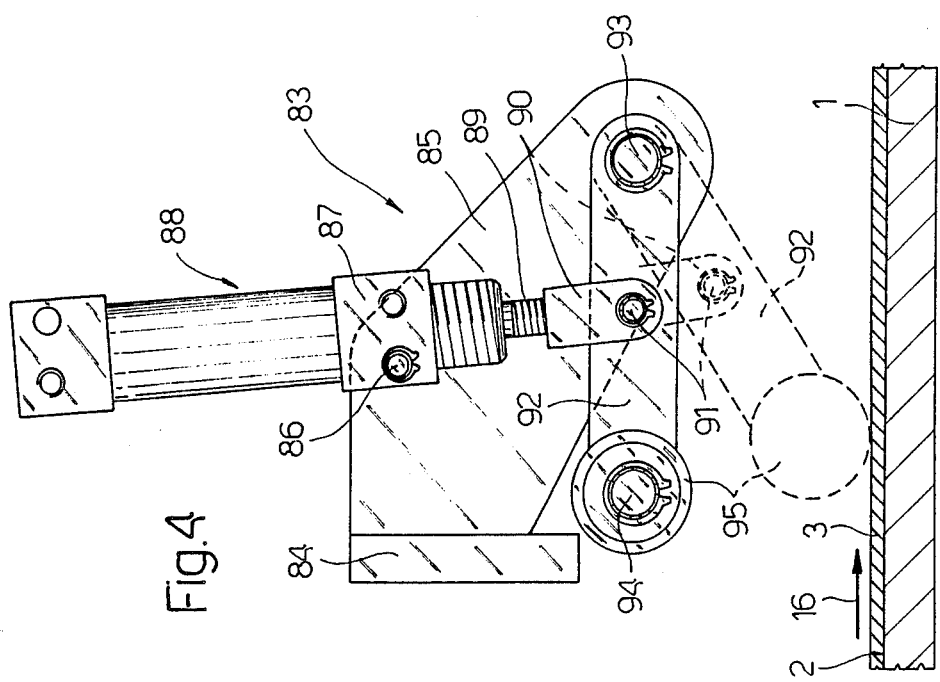

DEVICE FOR TRANSVERSELY CUTTING STRIPS OF DEFORMABLE MATERIAL

TECHNICAL FIELD

The present invention relates to a device for transversely cutting strips of deformable material, in particular, strips of elastomeric material.

BACKGROUND OF THE INVENTION

The cutting device covered by the present invention is particularly suitable for use in the tire manufacturing industry to which the following description refers, though purely by way of a non-limiting example which in no way limits the scope of the present invention.

In the tire manufacturing industry, certain tire parts are formed starting from continuous strips of elastomeric material. In more detail, transverse bevel cuts are made in the said strip by means of a blade inclined in relation to the surface supporting the uncut strip. By means of each of the said cuts, which are made in succession at a given position on said supporting surface, a strip portion, suitable for use in a tire, is cut off the end of the said continuous strip.

During each cutting operation, the blade, of whatever shape or type it may be, induces relatively severe cutting stress in the strip, on account of the inclined position of the blade in relation to the strip surface. At normal output rates, and with a strip the thickness of which exceeds a predetermined value, the said stress, which obviously depends on the type of blade, cutting speed and the type and thickness of material being cut, is usually severe enough to deform the strip by wrinkling the strip portion on the cutting line immediately ahead of the blade.

As such crumpling of the strip obviously results in inaccurate, undulated cuts, attempts have been made to reduce the said cutting stress by employing rotary blades. At the output rates permitted on current tire manufacturing machines, however, the sole employment of rotary blades has proven insufficient for preventing local deformation and wrinkling of relatively thick strips during cutting.

DISCLOSURE OF THE INVENTION

It is an object of the present invention to provide a cutting device for transversely cutting strips of deformable material, designed to enable relatively high cutting speeds and, at the same time, prevent wrinkling of the said strip.

According to the present invention, there is provided a device for transversely cutting a strip of deformable material, the said device comprising means for supporting a said uncut strip; a cutting blade positionable substantially tangent with the said supporting means and designed to move, in relation to the same, in a cutting direction transverse in relation to the said strip; characterized by the fact that it also comprises pressure means located ahead of the said blade in the said cutting direction; the said pressure means being designed to move with the said blade in the said cutting direction and along a cutting line, and cooperating, in use, with the said strip for pressing down, onto the said supporting means and during the said cutting operation, an uncut portion of the said strip located immediately ahead of the said blade in the said cutting direction.

The present invention will be described by way of example, with reference to the attached drawings.

BRIEF DESCRIPTION OF THE DRAWINGS

FIG. 4 shows an enlarged side view of a detail in FIGS. 1 and 2; and

FIG. 5 shows a front view of the detail shown in FIG. 4.

BEST MODE FOR CARRYING OUT THE INVENTION

Figure 3:
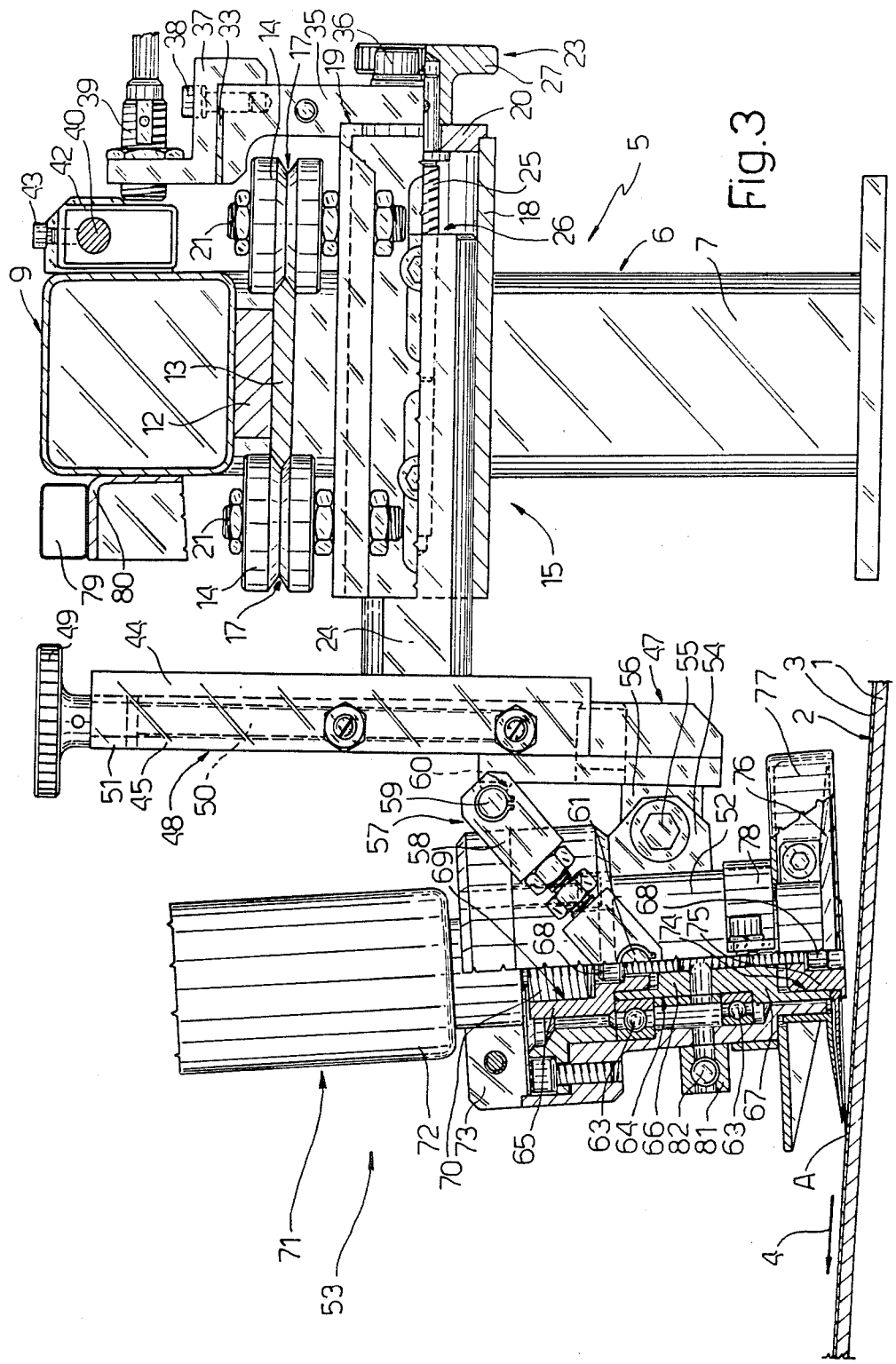
FIG. 3 shows a section along line III—III of FIG. 2.

Numeral 1 in FIG.3 indicates a flat table on the upper surface 2 of which is arranged, in a sliding manner, a strip 3 of elastomeric material which is fed along table 1 in the direction indicated by arrow 4 and parallel with the longitudinal axis of strip 3.

Figure 1:
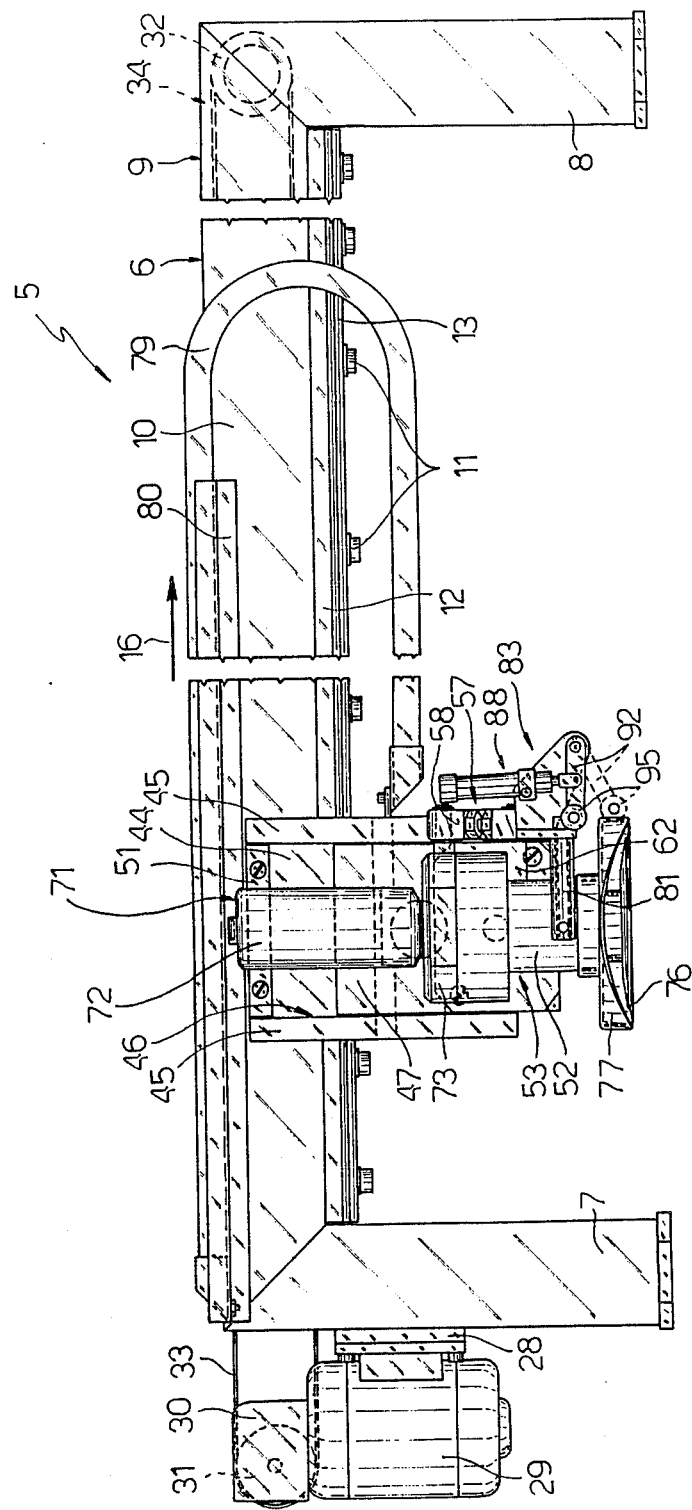
FIG. 1 is a front view, with parts removed for clarity, of a cutting device according to the present invention.
Figure 2:
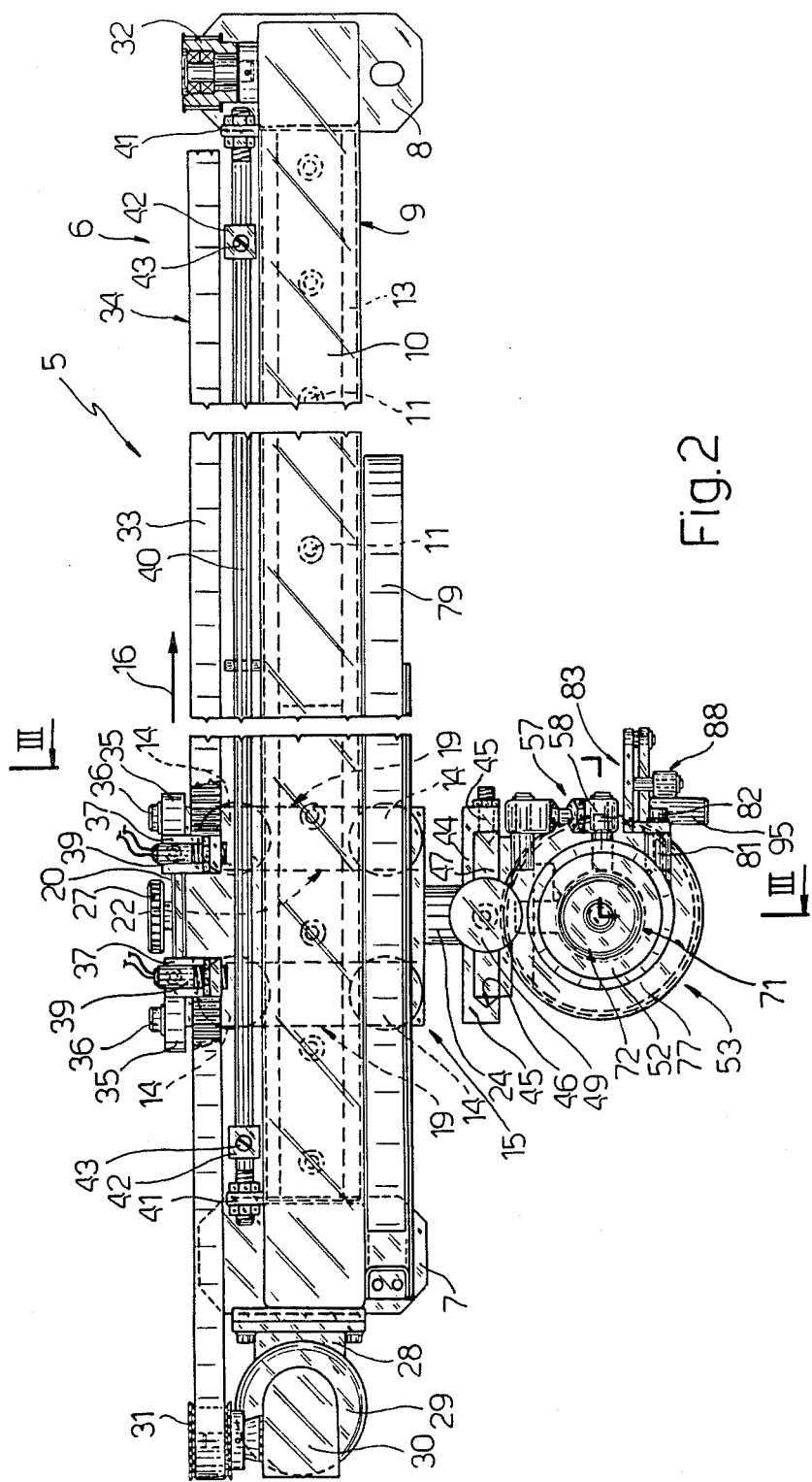
FIG. 2 is a plan view, as seen from above, of the device shown in FIG. 1.

Table 1 supports a cutting device 5 which, as shown in FIGS. 1, 2 and 3, comprises a substantially U-shaped load-bearing member or superstructure 6 consisting of two uprights, 7 and 8, extending upwards from surface 2 and connected together at their respective top ends by a crosspiece 9 extending over strip 3 and transversely in relation to arrow 4.

Crosspiece 9 comprises a box section 10 to the lower surface of which is connected, by means of a number of bolts 11 and via the interposition of a longitudinal spacing member 12, a blade 13 lying in a plane substantially parallel with surface 2. Blade 13 acts as a support and slideway for rollers 14 of slide 15 mounted in such a manner as to slide along crosspiece 9 in a cutting direction perpendicular to arrow 4 and indicated by arrow 16 in FIG. 2.

For this purpose, the opposite lateral edges of blade 13 project laterally outwards of spacing member 12 and each engage an annular groove 17 formed on the outer edge of two respective pairs of rollers 14.

As shown in FIG. 3, slide 15 presents a substantially rectangular horizontal section and comprises a lower plate 18 substantially parallel with surface 2 and having two upper box bodies 19 located at opposite lateral ends of plate 18 and connected together by a rear wall 20. Bodies 19 are each connected, by means of bolts 21, to two respective rollers 14 and combine to form, together with plate 18, a guide groove 22 (FIG.2) for a regulating device 23.

Device 23 includes a further slide 24 designed to travel, in relation to plate 18, in the direction of arrow 4, and is connected to a regulating screw 25 by means of a screw-nut screw coupling 26. Screw 25 extends through wall 20 and is fitted, to the rear of wall 20, with a control knob 27 by means of which slide 24 may be set in any required position along guide groove 22.

As shown in FIG.1 and, particularly, FIG.2, to the outer side surface of upright 7 there is connected, by means of bracket 28, a vertical-axis electric motor 29 designed to power, by means of reduction gear 30, a toothed pulley 31 having its horizontal axis parallel with arrow 4, and projecting rearwards of upright 7. To the rear surface of upright 8, there is connected a second toothed pulley 32 parallel with pulley 31 and engaged, together with pulley 31, by a toothed loop belt 33.

Motor 29, pulleys 31 and 32 and belt 33 constitute a driving device 34 for moving slide 15 along crosspiece 9. For this purpose, slide 15 is provided with two substantially vertical, rear brackets 35, each of which is connected at its bottom end to a respective box body 19 by means of screw 36, and is fitted at its top end with a substantially S-shaped member 37. Each member 37 is secured to the top of respective bracket 35 by means of a screw 38, for clamping a portion of belt 33 against bracket 35.

Displacement of slide 25 along crosspiece 9 is regulated by two proximity sensors 39, each of which is fitted, on respective member 37, facing a horizontal bar 40 secured to the rear surface of rod 10 by means of brackets 41 and supporting, in sliding manner, two limit stops 42 which may be locked in any position on bar 40 by means of respective lock screws 43.

As shown, particularly in FIGS. 1 and 3, the front end of slide 24 is connected integral with the rear surface of a vertical plate 44 having front vertical side ribs 45 defining a sliding groove 46 for slide 47 of a regulating device 48 controlled by means of a knob 49 fitted onto the top end of vertical screw 50. Screw 50 is connected, at the bottom, to slide 47 by means of a screw-nut screw coupling (not shown), and extends, at the top, through a transverse rib 51 closing the top of groove 46.

To the front surface of slide 47, there is connected a cylindrical body 52 for connecting a cutting fixture indicated as a whole by numeral 53. Cylindrical body 52 includes a rear radial bracket 54 hinged, by means of a horizontal bolt 55, to a bracket 56 projecting forwards from the bottom end of slide 47. Connection of cylindrical body 52 to slide 47 is completed by an angle regulating device 57 comprising an adjustable-length tie 58 hinged, at one end, to a horizontal pin 59 on a bracket 60 projecting forwards from the top end of slide 47, and, at the other end, to a horizontal pin 61 on a side bracket 62 (FIG.1) of body 52.

As shown in FIG.3, cylindrical body 52 presents a center through hole inside of which is mounted, in a rotary manner and via the interposition of two radial bearings 63, a shaft 64 comprising three axial portions, 65,66 and 67, connected by means of two axial screws 68.

The upper shaft portion 65 includes an internally-threaded axial slot 69 engaged by the threaded spindle 70 of a motor 71, one end of the outer casing 72 of which is clamped to cylindrical body 52 by means of deformable elastic collar 73.

Intermediate shaft portion 66 is connected to the two bearings 63, whereas lower shaft portion 67 includes an axial slot 74 inside which is fitted, by means of one of screws 68, the hub 75 of a circular blade 76 for which motor 71 constitutes the driving device.

The edge of blade 76 is partially protected by a plate 77 connected to the outer surface of cylindrical body 52 by means of retaining ring 78.

As shown in FIG.1, motor 71 is supplied electrically via a deformable channel 79, the initial portion of which is supported on a bracket 80 connected to the front wall of box rod 10, and the end of which is connected to one of ribs 45.

As shown in FIG.1, bracket 62 projects radially outwardly of body 52 perpendicular to bracket 54, and supports a horizontal rod 81 extending transversely in relation to the direction of arrow 4 and tangent with a point on the outer edge of cylindrical body 52 diametrically opposite bracket 54.

Rod 81 is arranged substantially over a cutting line, the intersection of which with the FIG.3 plane is shown by the letter A, and which extends parallel with crosspiece 9. Rod 81 presents a threaded axial hole engaged by a screw 82 securing, to cylindrical body 52, a pressure device indicated as a whole by numeral 83 and located ahead of cutting fixture 53 in the cutting direction indicated by arrow 16.

As shown, particularly in FIGS. 4 and 5, pressure device 83 includes a connecting plate 84 parallel with bracket 54 and connected to body 52 by means of screw 82, and a bracket 85 extending laterally from plate 84 and parallel with the direction of arrow 16. To a mid point on bracket 85, there is connected a transverse pin 86 fitted, in a rotary manner, with the body 87 of a double-acting pneumatic cylinder 88 supplied over ducts (not shown) extending along deformable channel 79.

Cylinder 88 includes a bottom output rod 89, the free end of which is connected to a connecting block 90 fitted through with a pin 91, parallel with pin 86, for hinge-connecting block 90 to the mid point of a lever 92. One end of lever 92 is connected to the free end of bracket 85 by means of pin 93 parallel with pin 86, whereas the other end, facing blade 76, supports, in rotary manner and by means of pin 94, a pressure roller 95 arranged facing strip 3. In more detail, roller 95 is arranged astride cutting line A, adjacent to the edge of blade 76 and immediately ahead of the same in the cutting direction indicated by arrow 16.

In actual use, after regulating the position of cutting fixture 53 in relation to support 6, by means of regulating devices 23 and 48, and after adjusting the angle of cutting fixture 53 and, consequently, blade 76 in relation to continuous strip 3, by means of regulating device 57, the operator may proceed to cut strip 3 transversely along line A. For this purpose, after arresting displacement of strip 3 along plate 1 and activating motor 71 for turning blade 76, the operator activates motor 29 so as to cause slide 15 to perform a cutting stroke by moving from a position (on the left in FIG.2) wherein left-hand sensor 39 is arranged facing left-hand limit stop 42, into a position (on the right in FIG.2) wherein right-hand sensor 39 is located facing right-hand limit stop 42. When slide 19 reaches the latter position, motor 29 is automatically reversed for returning slide 19 to its initial position on the left in FIG. 2.

Activation of motor 29, for causing slide 19 to perform the said cutting stroke, is accompanied by simultaneous activation of pneumatic cylinder 88 which moves pressure roller 95 from a raised idle position, indicated by the continuous line in FIG.4, into a lowered working position, indicated by the dotted line in FIG.4, wherein the edge of roller 95 presses, against surface 2, the portion of strip 3 located along cutting line A immediately ahead of blade 76. In like manner, the cutting strain induced in strip 3 by blade 76, during the cutting operation, is prevented from wrinkling the portion of strip 3 on the cutting line immediately ahead of blade 76.

When motor 29 is reversed, for returning slide 19, pneumatic cylinder 88 is activated for resetting roller 95 in the raised idle position.

From the forgoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to variuous modifications, changes or the like without departing from the spirit and scope of the invention with the latter being determined solely by reference to the claims appended hereto.

What is claimed is:

1. A device for transversely cutting a strip of deformable material, said device comprising means for supporting a said uncut strip; a cutting blade positionable substantially tangent with the said supporting means and designed to move, in relation to the same, in a cutting direction transverse in relation to the said strip, said device further comprising pressure means located ahead of the said blade in the said cutting direction; the said pressure means being designed to move with the said blade in the said cutting direction and along a cutting line, and cooperating, in use, with the said strip for pressing down, onto the said supporting means and during the said cutting operation, an uncut portion of the said strip located immediately ahead of the said blade in the said cutting direction.

2. A device as claimed in claim 1, further comprising a powered cutting fixture, the said blade being a circular blade forming part of the said cutting fixture and designed to turn about its own central axis.

3. A device as claimed in claim 2, wherein, in addition to the said circular blade, the said cutting fixture also comprises a transmission member and an electric motor; a first end of the said transmission member being angularly connected to a spindle on the said motor, and a second end of the said transmission member being angularly connected to the said circular blade.

4. A device as claimed in claim 3, further comprising a guide means facing the said supporting means and extending parallel with the said cutting direction, a slide mounted in such a manner as to slide along the said guide means, actuating means for moving the said slide back and forth along the said guide means, and connecting means for connecting the said cutting fixture to the said slide.

5. A device as claimed in claim 4, wherein said connecting means includes first regulating means for regulating the position of the said cutting fixture in relation to the said slide in a first direction substantially perpendicular to the said guide means, second regulating means for regulating the position of the said cutting fixture in relation to the said slide in a second direction substantially perpendicular to both the said guide means and the said first direction, and third regulating means for regulating an angle between the said central axis of the said circular blade and the said means supporting the said strip.

6. A device as claimed in claim 2, wherein said pressure means are supported on the said cutting fixture and comprise a pressure roller mounted in rotary manner on a pin extending perpendicular to the said cutting direction and parallel with the said means supporting the said strip; actuating means being provided for shifting the said roller from and into a lowered position wherein the said roller is set, in use, contacting the said strip and astride the said cutting line.

* * * * *